US008675866B2

(12) United States Patent
Farrugia et al.

(10) Patent No.: US 8,675,866 B2
(45) Date of Patent: Mar. 18, 2014

(54) MULTIPLICATIVE SPLITS TO PROTECT CIPHER KEYS

(75) Inventors: Augustin J. Farrugia, Cupertino, CA (US); Benoit Chevallier-Mames, Paris (FR); Bruno Kindarji, Paris (FR); Mathieu Ciet, Paris (FR); Thomas Icart, Paris (FR)

(73) Assignee: Apple Inc., Cupertino, CA (US)

( * ) Notice: Subject to any disclaimer, the term of this patent is extended or adjusted under 35 U.S.C. 154(b) by 326 days.

(21) Appl. No.: 13/178,410

(22) Filed: Jul. 7, 2011

(65) Prior Publication Data

US 2013/0010963 A1   Jan. 10, 2013

(51) Int. Cl.
*H04L 9/06* (2006.01)
(52) U.S. Cl.
USPC .......... 380/28; 380/1; 380/29; 380/259; 713/187; 726/22
(58) Field of Classification Search
None
See application file for complete search history.

(56) References Cited

U.S. PATENT DOCUMENTS

| 2004/0028224 | A1* | 2/2004 | Liardet et al. | 380/37 |
| 2007/0014395 | A1* | 1/2007 | Joshi et al. | 380/28 |
| 2010/0054460 | A1* | 3/2010 | Martinez et al. | 380/28 |
| 2011/0029784 | A1* | 2/2011 | Genelle et al. | 713/189 |

OTHER PUBLICATIONS

Akkar et al., An Implementation of DES and AES Secure Against Some Attacks, 2001, Springer-Verlag, CHES 2001, LNCS 2162, pp. 309-318.*
PCT International Search Report and Written Opinion of the International Authority for PCT/US2012/045819 mailed Dec. 3, 2012.
Daemen J. et al., "Implementation Aspects", Feb. 18, 2002, The Design of Rijndael, Springer Verlag, De, pp. 53-62, XP007913599.
Daemen J. et al.,"Specification of Rijndael", Jan. 1, 2002, The Design of Rijndael, AES—The Advanced Encryption Standard, Springer, pp. 31-51, XP007919936.
Jovan DJ Golic: "Multiplicative Masking and Power Analysis of AES", International Association For Cryptologic Research, vol. 20020708, Jul. 8, 2002, pp. 1-10, XP061000439.

* cited by examiner

*Primary Examiner* — Jung Kim
*Assistant Examiner* — Adrian Stoica
(74) *Attorney, Agent, or Firm* — Blakely, Sokoloff, Taylor & Zafman LLP

(57) ABSTRACT

In the field of computer enabled cryptography, such as a keyed block cipher having a plurality of rounds, the cipher is hardened against an attack by a protection process which obscures the round keys using the properties of group field automorphisms and applying masks to the states of the cipher, for encryption or decryption. This is especially advantageous in a "White Box" environment where an attacker has full access to the cipher algorithm, including the algorithm's internal state during its execution. This method and the associated computing apparatus are useful for protection against known attacks on "White Box" ciphers, by eliminating S-box operations, together with improved masking techniques and increasing the cipher's complexity against reverse engineering and key storage attacks.

25 Claims, 3 Drawing Sheets

MULTIPLICATIVE SPLITS TO PROTECT CIPHER KEYS

FIELD OF THE INVENTION

This invention relates to data security, cryptography and cipher key protection.

BACKGROUND

In the field of data security, there is a need for fast and secure encryption. This is why the AES (Advanced Encryption Standard) cipher has been designed and standardized to replace the DES (Data Encryption Standard) cipher. Cryptographic algorithms are widely used for encryption and decryption of messages, authentication, digital signatures and identification. AES is a well known symmetric block cipher. Block ciphers operate on blocks of plaintext and ciphertext, usually of 64 or 128 bits length but sometimes longer. Stream ciphers are the other main type of cipher and operate on streams of plain text and cipher text 1 bit or byte (sometimes one word) at a time. There are modes of operation (notably the ECB, electronic code block) where a given block is encrypted to always the same ciphertext block. This is an issue which is solved by a more evolved mode of operations, e.g. CBC (cipher block chaining) where a chaining value is used to solve the 1-to-1 map.

AES is approved as an encryption standard by the U.S. Government. Unlike its predecessor DES (Data Encryption Standard), it is a substitution permutation network (SPN). AES is fast to execute in both computer software and hardware implementation, relatively easy to implement, and requires little memory. AES has a fixed block size of 128 bits and a key size of 128, 192 or 256 bits. Due to the fixed block size of 128 bits, AES operates on a 4×4 array of bytes. It uses key expansion and like most block ciphers a set of encryption and decryption rounds (iterations). Block ciphers of this type include in each round use of substitution boxes (S-boxes). This operation provides non-linearity in the cipher and significantly enhances security.

Note that these block ciphers are symmetric ciphers, meaning the same key is used for encryption and decryption. As is typical in most modern ciphers, security rests with the (secret) key rather than the algorithm. The S-boxes accept an n-bit input and provide an m-bit output. The values of m and n vary with the cipher and the S-box itself. The input bits specify an entry in the S-box in a particular manner well known in the field.

Many encryption algorithms are primarily concerned with producing encrypted data that is resistant to decrypting by an attacker who can interact with the encryption algorithm only as a "Black Box" (input-output) model, and cannot observe internal workings of the algorithm or memory contents, etc. due to lack of system access. The Black Box model is appropriate for applications where trusted parties control the computing systems for both encoding and decoding ciphered materials.

However, many applications of encryption do not allow for the assumption that an attacker cannot access internal workings of the algorithm. For example, encrypted digital media often needs to be decrypted on computing systems that are completely controlled by an adversary (attacker). There are many degrees to which the Black Box model can be relaxed. An extreme relaxation is called the "White Box" model. In a White Box model, it is presumed that an attacker has total access to the system performing an encryption (or decryption), including being able to observe directly a state of memory, program execution, modifying an execution, etc. In such a model, an encryption key can be observed in or extracted from memory, and so ways to conceal operations indicative of a secret key are important.

Classically, software implementations of cryptographic building blocks are insecure in the White Box threat model where the attacker controls the execution process. The attacker can easily lift the secret key from memory by just observing the operations acting on the secret key. For example, the attacker can learn the secret key of an AES software implementation by observing the execution of the key schedule algorithm.

Hence there are two basic principles in the implementation of secure computer applications (software). The Black Box model implicitly supposes that the user does not have access to the computer code nor any cryptographic keys themselves. The computer code security is based on the tampering resistance over which the application is running, as this is typically the case with SmartCards. For the White Box model, it is assumed the (hostile) user has partially or fully access to the implemented code algorithms; including the cryptographic keys themselves. It is assumed the user can also become an attacker and can try to modify or duplicate the code since he has full access to it in a binary (object code) form. The White Box implementations are widely used (in particular) in content protection applications to protect e.g. audio and video content.

Straightforward software implementations of cryptographic building blocks are insecure in the White Box threat model where the attacker controls the computer execution process. The attacker can easily extract the (secret) key from the memory by just observing the operations acting on the secret key. For instance, the attacker can learn the secret key of an AES cipher software implementation by passively monitoring the execution of the key schedule algorithm. Also, the attacker could be able to retrieve partial cryptographic result and use it in another context (using in a standalone code, or injecting it in another program, as an example).

Content protection applications such as for audio and video data are one instance where it is desired to keep the attacker from finding the secret key even though the attacker has complete control of the execution process. The publication "White-Box Cryptography in an AES implementation" Lecture Notes in Computer Science Vol. 2595, Revised Papers from the 9th Annual International Workshop on Selected Areas in Cryptography pp. 250-270 (2002) by Chow et al. discloses implementations of AES that obscure the operations performed during AES by using table lookups (also referred to as TLUs) to obscure the secret key within the table lookups, and obscure intermediate state information that would otherwise be available in arithmetic implementations of AES. In the computer field, a table lookup table is an operation consisting of looking in a table (also called an array) at a given index position in the table.

Chow et al. (for his White Box implementation where the key is known at the computer code compilation time) uses 160 separate tables to implement the 11 AddRoundKey operations and 10 SubByte Operations (10 rounds, with 16 tables per round, where each table is for 1 byte of the 16 byte long—128 bit—AES block). These 160 tables embed a particular AES key, such that output from lookups involving these tables embeds data that would normally result from the AddRoundKey and SubByte operations of the AES algorithm, except that this data includes input/output permutations that make it more difficult to determine what parts of these tables represent round key information derived from the AES key. Chow et al. provide a construction of the AES algorithm for such White Box model. The security of this construction resides in the use of table lookups and permutations applied on the input and output of table lookups. The input and output mask applied to this data is never removed along the process. In this solution, there is a need for knowing the key value at the compilation time, or at least to be able to derive the tables from the original key in a secure environment or in a secure way.

The conventional implementation of a block cipher in the White Box model is carried out by creating a set of table lookups. Given a dedicated cipher key, the goal is to store in a table the results for all the possible input messages. This principle is applied for each basic operation of the block cipher. In the case of the AES cipher, these are the shiftRow, the add RoundKey, the subByte and the mixColumns operations.

However, Chow et al. do not solve all the security needs for block cipher encryption in a White Box environment. Indeed, the case where the cipher key is derived through a given process and so is unknown at the code compilation time is not addressed by Chow et al. Further, the publication "Cryptanalysis of a White Box AES Implementation" by Olivier Billet et al., in "Selected Areas in Cryptography 2004" (SAC 2004), pages 227-240 is an efficient attack on a White Box cipher of the type described by Chow et al., indicating weaknesses in Chow et al.'s approach. Software implementations of cryptographic building blocks are thus insecure in the White Box threat model where the attacker controls the execution process. The attacker can easily lift the secret key from memory by just observing the operations acting on the secret key. For example, the attacker can learn the secret key of an AES software implementation by observing the execution of the key schedule algorithm.

SUMMARY

One typical case is when computer software to carry out a cryptographic process is distributed over several users and each one of them has his own cryptographic key; this key set is, from a practical point of view, impossible to disseminate to each user. Another case is when generating session keys (a different key for each session) through a given process. Of course, in this case the key is unknown at the code (software) compilation time. A last case is when it is necessary to store a large number of keys. It is not reasonable to consider storing about 700 kB of data (the value provided by Chow et al.) for each key (since these keys are very lengthy).

Hiding the keys of an AES execution is an important part of the AES White Box approach. The present method is based on algebraic properties of the AES S-box operation that enable one to compute the ARK (add round key) cipher operation using operations both before and after the S-box operation and avoiding direct use of the S-Box. In particular, the key is not stored partitioned as is conventional by an XOR (exclusive OR) operation but in a novel form. This approach is generally applicable to block ciphers having an inversion function. More specifically, here a sub-key is conventionally added to a message state (the add round key operation) and then the resulting state is subject to an inversion function in a predetermined mathematical field in place of the conventional S-Box operation followed by an affine operation.

DETAILED DESCRIPTION

AES Description

Figure 1:
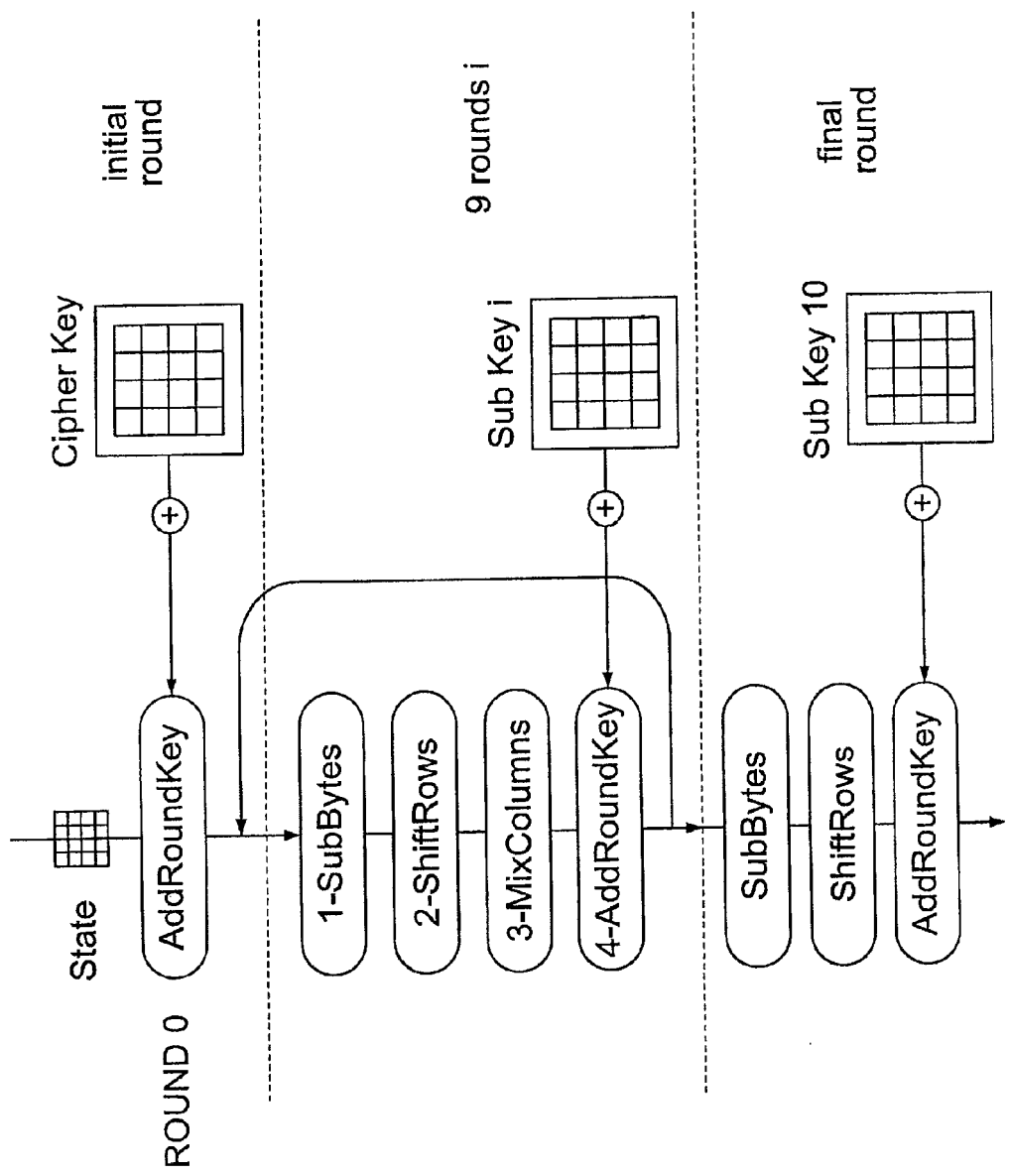
FIG. 1 shows, in the prior art, AES encryption.

See the NIST AES standard for a more detailed description of the AES cipher: Specification for the ADVANCED ENCRYPTION STANDARD (AES), NIST, http://csrc.nist-.gov/publications/fips/fips197/fips-197.pdf. The following is a summary of the well known AES cipher. The AES cipher uses a 16 byte cipher key, and has 10 rounds (final found plus 9 others). The AES encryption algorithm has the following operations as depicted graphically in prior art FIG. 1 and showing round zero of the 9 rounds:

11 AddRoundKey Operations
10 SubByte Operations
10 ShiftRow Operations
9 MixColumn Operations AES is computed using a 16-byte buffer (computer memory) referred to as the AES "state" in this disclosure and shown in FIG. 1.

To summarize,
(i) AddRoundKeys (ARK) logically XOR (the Boolean exclusive OR operation) some sub-key bytes with the state bytes.
(ii) ShiftRows (SR) are a move from one byte location to another.
(iii) MixColums (MC) are a linear table-look up (TLU), applied to 4 bytes.
(iv) SubBytes (SB) are a non-linear TLU, applied to 1 byte.

Preliminarily to the encryption itself, in the initial round in FIG. 1, the original 16-byte cipher key is expanded to 11 sub-keys (also called round keys) designated $K0, \ldots, K10$, so there is a sub-key for each round, during what is called the key-schedule. Each sub-key, like the original cipher key, is 16-bytes long.

The following explains AES decryption round by round. For the corresponding encryption (see FIG. 1), one generally performs the inverse of each operation, in the inverse order. (The same is true for the cryptographic processes in accordance with the invention as set forth below.) The inverse operation of ARK is ARK itself, the inverse operation of SB is the inverse subbyte (ISB) which is basically another TLU, the inverse operation of MC is the inverse mix column (IMC) which is basically another TLU, and the inverse operation of SR is the inverse shift row (ISR) which is another move from one byte location to another.

Expressed schematically, AES decryption round-by-round is as follows:
ARK (K10)
ISR
ISB
ARK (K9)
IMC
ISR
ISB
ARK (K8)
IMC
ISR
ISB
ARK (K7)
IMC
ISR
ISB
ARK (K6)
IMC ISR
ISB
ARK (K5)
IMC
ISR
ISB
ARK (K4)
IMC
ISR
ISB
ARK (K3)
IMC
ISR
ISB
ARK (K2)
IMC
ISR
ISB
ARK (K1)
IMC
ISR
ISB
ARK (K0)

Without lack of generality, the exemplary description here of the present method is for decryption, but it is evident that the method in accordance with the invention can be used also for encryption (see FIG. 1 showing conventional AES encryption) or other cryptographic processes. The method in accordance with the invention also can easily be applied to other variants of AES with more rounds (the 192 and 256-bit key length versions even with a 128 bit block size) as well as to other block ciphers and more generally to non-block ciphers and other key based cryptographic processes.

AES is considered very efficient in terms of execution on many different computer architectures since it can be executed only with table lookups (TLU) and the exclusive-or (XOR) operation. It is known that the AES state can be handled as a 4×4 square of bytes. As a square, it can be seen as 4 columns of 4 bytes each.

As described above, AES decryption is a succession of basic operations: ISB for the inverse of SubByte, IMC (for the inverse of MixColumn) and ISR (for the inverse of ShiftRow). The ISR operation modifies the state by shifting each row of the square. This operation does not modify the bytes themselves but only their respective positions. The ISB operation is a permutation from [0, 255] to [0, 255], which can be implemented by a table look-up.

AES Properties

The following describes known properties of components of the AES cipher that are used in the present method to improve security of the AES (or any similar) cipher. The SubByte (SB) operation was intentionally chosen by the designers of the AES cipher. As well known, in the SB operation, each data byte in the array (state) is updated using an 8-bit substitution box called the S-box. The S-box includes a multiplication inverse in the well known (in mathematics) Galois Field of 256, referred to as GF ($2^8$), to provide non-linearity to the cipher. The S-box combines the inverse function extended to 0 with an invertible affine function. The SubByte operation thus is a function GF($2^8$). A Galois field in mathematics is a field (e.g., a set) that contains only a finite number of elements, called the "order". So for the operation in GF($2^8$):

$$SB(x)=A(x^{254})$$

where A is the given affine function (see the AES cipher specification) and x is the cipher state value and a byte is considered as an element of GF($2^8$). An affine function performs an affine transformation on its argument (e.g., a vector) to linearly transform (rotate or scale) and translate X (shift) the argument to another vector. The notation A(X) means the affine function applied to value X.

One can then write in terms of the cipher operations SB, ISB:

$$SB=A \circ INV,$$

and $$ISB=INV \circ A^{-1}$$

where INV is the multiplicative inversion in GF($2^8$), $A^{-1}$ is the inverse of the affine function A, and here symbol "∘" designates a composition of functions. (Multiplicative inversion here means conventionally that the inversion of x is 1/x, unless x=0 when $1/x=x^{254}$.)

The S-box is defined as (for any x in GF($2^8$)):

$$S(x)=A(INV(x)) \quad (1)$$

where INV is the inversion in GF(256) (except for 0 which is inverted into 0) and A is an affine bijective function. "Affine" means a function such that for all x, y, z in GF(256):

$$A(x) \oplus A(y) \oplus A(z) = A(x \oplus y \oplus z) \quad (2)$$

where ⊕ (i.e., an XOR) designates the addition operation in GF($2^8$).

The following explanation is in the context of AES decryption but can be easily adapted to AES encryption and to similar operations for other block ciphers.

AES Decryption

One can rewrite the AES decryption operations described above as:
ARK (K10)
ISR
ISB
IMC
ARK (K'9)
ISR
ISB
IMC
ARK (K'1)
ISR
ISB
ARK (K0)
where K'i=IMC(Ki)

From equation (1), it is known that the decryption operation using the S-Box is defined as:

$$ISB(x)=INV((A^{-1})(x)) \quad (3)$$

where $A^{-1}$ is the inverse of A, and is also an affine bijective function.

Using this, one can rewrite the above sequence of cipher operations as:
ARK (K10)
ISR
$A^{-1}$
INV
IMC
ARK (K'9)
ISR
$A^{-1}$
INV
IMC
ARK (K'1)
ISR
$A^{-1}$

INV
ARK (K0)

From equation (2), one knows that:

$$A^{-1}(x \oplus K) = A^{-1}(x \oplus K \oplus 0) = A^{-1}(x) \oplus A^{-1}(K) \oplus A^{-1}(0)$$

Let $K''i = A^{-1}(ISR(K'i)) \oplus A^{-1}(0)$

One then can rewrite the above sequence of cipher decryption operations as:

ISR
$A^{-1}$
ARK (K"10)
INV
IMC
ISR
$A^{-1}$
ARK (K"9)
INV
IMC
. . .
ISR
$A^{-1}$
ARK (K"1)
INV
ARK (K0)

So here for a round (1) the IS (inverse subbyte) operation (which is the S-box) is removed; (2) the order of the remaining operations is changed as regards the add round key operation; (3) the affine bijective function is inserted immediately before the add round key operation; and (4) the inversion operation is inserted immediately after the add round key operation. The inversion operation combined with the affine function is the equivalent of the (removed) inverse subbyte (ISB) operation, in GF(256). Similarly for encryption, the operations ARK, SB are replaced by the affine operation, ARK, and INV, since $SB = A \circ INV(x)$.

Mathematical Properties

For all values $x \neq 0$ and for all y, the following stands:

$$x \oplus y = x \cdot (1 \oplus (y \cdot INV(x))) \quad (4)$$

where "·" designates the multiplication operation in GF(256). From equation (4):

$$INV(x \oplus y) = INV(x) \cdot INV(1 \oplus (y \cdot INV(x))) \quad (5)$$

Equation (5) shows that it is possible to compute the inverse function "INV" of the XOR (Boolean exclusive OR) of two values. In a conventional context, where both values x and y are masked with the same (additively applied) mask value M:

$$X = x \oplus M$$

$$Y = y \oplus M$$

(Masking is a well known way to obscure or hide a value by applying to it another "mask" value using a mathematical or logical operation.)

One can still use equation (5) to compute $INV(x \oplus y)$, as long as X is not equal to zero:

$$INV(x \oplus y) = INV(X \oplus Y) = INV(X) \cdot INV(1 \oplus (Y \cdot INV(X)))$$

Mathematical Properties Applied to AES

As shown above for AES decryption, one has:
ARK (K"i)
INV which are consecutive operations present in all the sub-key rounds, except for that of sub-key K0. So one wants to compute:

$$INV(K''i \oplus S)$$

where S is a variable that represents the cipher message state for any round. Let M be a mask value chosen such that $K''i \oplus M$ is different from 0. Hence one can use equation (5) to compute $INV(K''i \oplus S)$:

$$INV(K''i \oplus S) = INV(K''i \oplus M) \cdot INV(1 + ((S \oplus M) \cdot INV(K''i \oplus M)))$$

Here the key is stored as $W = INV(K''i + M)$ and the computation is:

$$INV(K''i \oplus S) = W \cdot INV(1 \oplus ((S \oplus M) \cdot W))$$

The sub-key is thus stored not only in a masked format but in the image of the non-linear function (operation) "INV". This provides additional security compared to other hiding techniques using a mask or a linear permutation of the key.

The present method is thus a way to perform the calculation of $INV(K''i \oplus S)$ in a novel and secure way, in order to protect the secret key K"i. Notably, no S-box is used here.

The K0 Case

As shown for AES decryption, sub-key K0 is not used in its round in the same way as the other sub-keys since the K0 round has no S-box (ISB or SB) operation. Indeed, sub-key K0 is involved in the last round computation of the decryption as follows:

ARK (K"1)
INV
ARK (K0)

It is useful to hide sub-key K0, since that last round is the easiest round to reverse engineer. The previous method can be adapted in this case by including the K0 to the K"1 computations. The computation is:

$$K0 \oplus INV(K''1 \oplus S),$$

where S denotes the previous byte (then there are 16 states).

In a practical implementation, the keys and state are not in clear, but are masked. So M0 is the mask value for key K0 and M1 is the mask value for key K"1. Then, denote K'0 as $K0 \oplus M0$, S' as $S \oplus M1$ and K'''1 as $K''1 \oplus M1$. This means one computes in practice:

$$K'0 \oplus M0 @ INV(K'''\oplus S') \quad (6)$$

As for the previous case, one chooses mask value M1 such that K'''1 is non-zero.

Key Representation—Last Round

Let
$U = M0 \cdot K'''1$
$V = K'0 \cdot K'''1$
$W = Inv(K'''1)$

These three values U, V, W are each independent from (meaning there is no obvious relation to) the cipher state value S'.

Computational Results for Equation (6)

Let
$T1 = S' \cdot W$
$T2 = (M_0 \cdot S') \oplus V \oplus 1$

If $T_1$ is different from 1, equation (6) can be rewritten as:

$$W \cdot ((T1 \cdot V) \oplus T2 \oplus U) \cdot INV(T1 \oplus 1) \quad (7)$$

whereas, if $T_1$ is equal to 1, equation (6) can be rewritten as:

$$W \cdot (U \oplus V) \quad (8)$$

A way to implement these different cases is to reuse equation (7) using different values of T1 and T2 for the special case T1=1. Indeed, if $$T1 = 0$$

$$T2 = V$$

one knows that:

$$W \cdot ((T1 \cdot V) \oplus T2 \oplus U) \cdot INV(T1 \oplus 1) = W \cdot (U \oplus V)$$

Execution Steps—Last Round

One can implement these last round operations together. Executing the following steps (expressed in pseudo-code which is a non-executable representation of actual computer code) is sufficient to execute the last round:

```
Compute T1 = S' . W
if (T1 == 1)
    Set T1 = 0
    Set T2 = V
else
    Set T1 = T1
    Set T2 = (M₀ . S') ⊕ V ⊕ 1
endif
Return W . (T1 . V ⊕ T2 ⊕ U) . Inv(T1 ⊕ 1)
```

This execution effectively computes the two ARK operations and the inversion steps of the last AES round.

This previous method can be used for the last round ARK operations in the AES cipher:
ARK (K"1)
INV
ARK (K0)
However importantly, it can also be used for any or all of the other AES rounds. For instance for the second (K9) round, the operations:
ARK (K"9)
INV
IMC
$A^{-1}$
ARK (K"8)
can be implemented as:
ARK (K"9)
INV
ARK (K8)
IMC
$A^{-1}$
to use this method on round keys K"9, K8:
ARK (K"9)
INV
ARK (K8)

The above shows implementation of two Add Round Key operations using novel key representations. Indeed the round keys are stored as U, V, W where:

$$U = M0 \cdot K'''_1$$

$$V = K'0 \cdot K'''_1$$

$$W = INV(K'''_1)$$

Moreover, the execution of the cipher is completely different from what is done conventionally, resulting in a hardened cipher, in terms of both reverse engineering and key storage.

Figure 2:
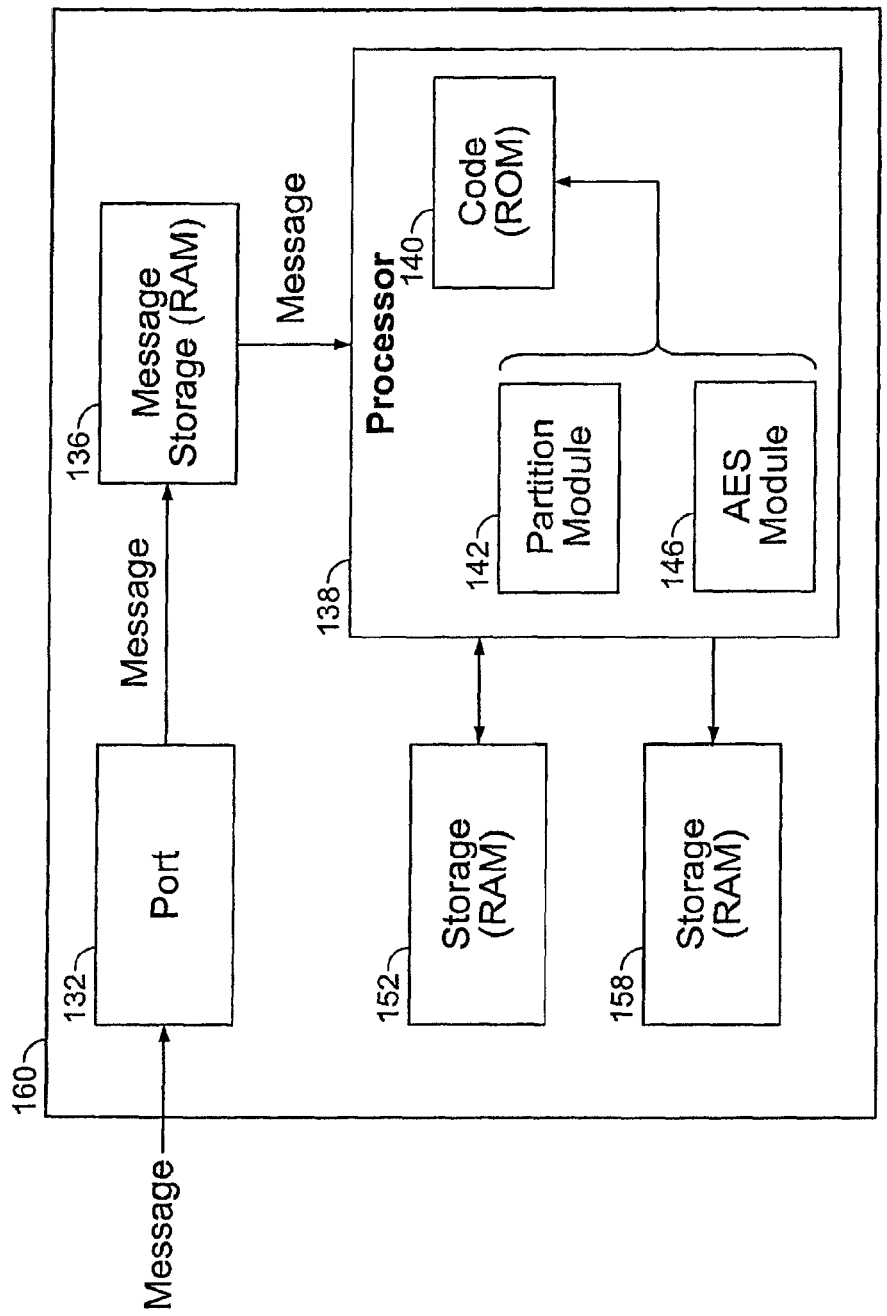
FIG. 2 shows a computing system in accordance with the invention.

FIG. 2 shows in a block diagram relevant portions of a computing device (system) 160 in accordance with the invention which carries out the cryptographic processes as described above. This is, e.g., a server platform, computer, mobile telephone, Smart Phone, personal digital assistant or similar device, or part of such a device and includes conventional hardware components executing in one embodiment software (computer code) which carries out the above examples. This code may be, e.g., in the C or C++ computer language or its functionality may be expressed in the form of firmware or hardware logic; writing such code or designing such logic would be routine in light of the above examples and logical expressions. Of course, the above examples are not limiting. Only relevant portions of this apparatus are shown for simplicity. Essentially a similar apparatus encrypts the message, and may indeed be part of the same platform.

The computer code is conventionally stored in code memory (computer readable storage medium) 140 (as object code or source code) associated with conventional processor 138 for execution by processor 138. The incoming ciphertext (or plaintext) message (in digital form) is received at port 132 and stored in computer readable storage (memory 136 where it is coupled to processor 138. Processor 138 conventionally then partitions the message into suitable sized blocks at partitioning module 142. Another software (code) module in processor 138 is the decryption (or encryption) module 146 which carries out the state and key masking and decryption or encryption functions as set forth above, with its associated computer readable storage (memory) 152.

Also coupled to processor 138 is a computer readable storage (memory) 158 for the resulting decrypted plaintext (or encrypted ciphertext) message. Storage locations 136, 140, 152, 158 may be in one or several conventional physical memory devices (such as semiconductor RAM or its variants or a hard disk drive). Electric signals conventionally are carried between the various elements of FIG. 6. Not shown in FIG. 2 is any subsequent conventional use of the resulting plaintext or ciphertext stored in storage 145.

Figure 3:
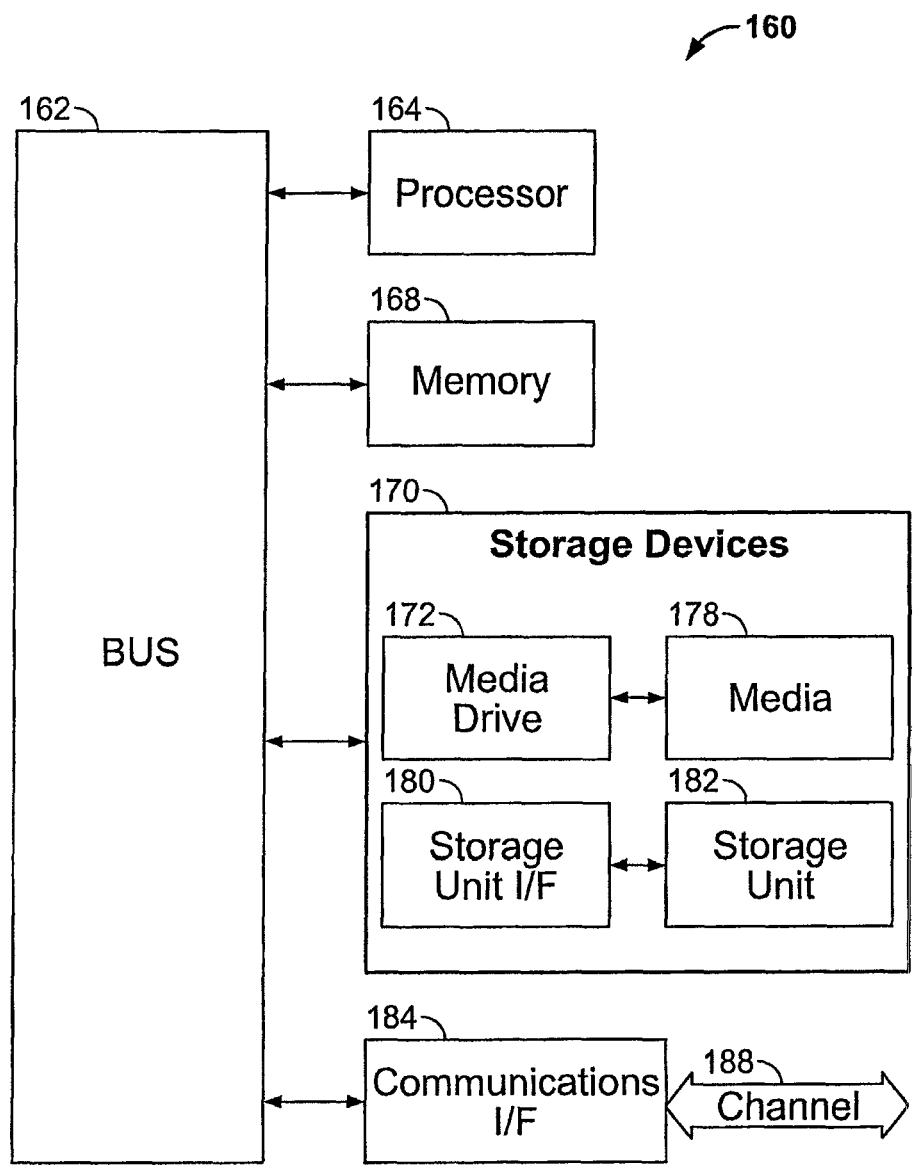
FIG. 3 shows a computing system as known in the art and used in accordance with the invention.

FIG. 3 illustrates detail of a typical and conventional embodiment of computing system 160 that may be employed to implement processing functionality in embodiments of the invention as indicated in FIG. 2 and includes corresponding elements. Computing systems of this type may be used in a computer server or user (client) computer or other computing device, for example. Those skilled in the relevant art will also recognize how to implement embodiments of the invention using other computer systems or architectures. Computing system 160 may represent, for example, a desktop, laptop or notebook computer, hand-held computing device (personal digital assistant (PDA), cell phone, palmtop, etc.), mainframe, server, client, or any other type of special or general purpose computing device as may be desirable or appropriate for a given application or environment. Computing system 160 can include one or more processors, such as a processor 164 (equivalent to processor 138 in FIG. 2). Processor 164 can be implemented using a general or special purpose processing engine such as, for example, a microprocessor, microcontroller or other control logic. In this example, processor 164 is connected to a bus 162 or other communications medium.

Computing system 160 can also include a main memory 168 (equivalent of memories 136, 140, 152, and 158), such as random access memory (RAM) or other dynamic memory, for storing information and instructions to be executed by processor 164. Main memory 168 also may be used for storing temporary variables or other intermediate information during execution of instructions to be executed by processor 164. Computing system 160 may likewise include a read only memory (ROM) or other static storage device coupled to bus 162 for storing static information and instructions for processor 164.

Computing system 160 may also include information storage system 170, which may include, for example, a media drive 162 and a removable storage interface 180. The media drive 172 may include a drive or other mechanism to support fixed or removable storage media, such as flash memory, a hard disk drive, a floppy disk drive, a magnetic tape drive, an optical disk drive, a compact disk (CD) or digital versatile disk (DVD) drive (R or RW), or other removable or fixed media drive. Storage media 178 may include, for example, a hard disk, floppy disk, magnetic tape, optical disk, CD or DVD, or other fixed or removable medium that is read by and written to by media drive 72. As these examples illustrate, the storage media 178 may include a computer-readable storage medium having stored therein particular computer software or data.

In alternative embodiments, information storage system 170 may include other similar components for allowing computer programs or other instructions or data to be loaded into computing system 160. Such components may include, for example, a removable storage unit 182 and an interface 180, such as a program cartridge and cartridge interface, a removable memory (for example, a flash memory or other removable memory module) and memory slot, and other removable storage units 182 and interfaces 180 that allow software and data to be transferred from the removable storage unit 178 to computing system 160.

Computing system 160 can also include a communications interface 184 (equivalent to part 132 in FIG. 2). Communications interface 184 can be used to allow software and data to be transferred between computing system 160 and external devices. Examples of communications interface 184 can include a modem, a network interface (such as an Ethernet or other network interface card (NIC)), a communications port (such as for example, a USB port), a PCMCIA slot and card, etc. Software and data transferred via communications interface 184 are in the form of signals which can be electronic, electromagnetic, optical or other signals capable of being received by communications interface 184. These signals are provided to communications interface 184 via a channel 188. This channel 188 may carry signals and may be implemented using a wireless medium, wire or cable, fiber optics, or other communications medium. Some examples of a channel include a phone line, a cellular phone link, an RF link, a network interface, a local or wide area network, and other communications channels.

In this disclosure, the terms "computer program product," "computer-readable medium" and the like may be used generally to refer to media such as, for example, memory 168, storage device 178, or storage unit 182. These and other forms of computer-readable media may store one or more instructions for use by processor 164, to cause the processor to perform specified operations. Such instructions, generally referred to as "computer program code" (which may be grouped in the form of computer programs or other groupings), when executed, enable the computing system 160 to perform functions of embodiments of the invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 160 using, for example, removable storage drive 174, drive 172 or communications interface 184. The control logic (in this example, software instructions or computer program code), when executed by the processor 164, causes the processor 164 to perform the functions of embodiments of the invention as described herein.

This disclosure is illustrative and not limiting. Further modifications will be apparent to these skilled in the art in light of this disclosure and are intended to fall within the scope of the appended claims.

We claim:

1. A method of performing on a message a cryptographic process which includes a plurality of rounds, each round having an associated round key, each round including a plurality of cipher operations comprising:
   receiving the message at a port;
   storing the message in a first computer readable storage medium coupled to the port;
   storing the round keys for a last one of the rounds and a previous round as a mask value times the round key of the previous round, a product of the last and previous round keys, and an inverse of the previous round key; and
   at a processor coupled to the first computer readable storage medium, applying the plurality of cipher operations for at least one of the rounds sequentially to the message thereby generating a state for each operation, wherein the round includes no S-box cipher operation, includes a cipher round key operation, and at least one inversion operation immediately prior to or following the round key operation, and further includes an affine bijective function respectively following or prior to the round key operation.

2. The method of claim 1, wherein in combination the affine bijective function and inversion operation are a substitution box operation in a Galois field.

3. The method of claim 2, further comprising:
   applying an additive mask value to the round key before executing the inversion operation; and
   applying an additive mask value to the state before applying the inversion operation.

4. The method of claim 3, further comprising storing a masked key value and performing the inversion operation on the masked key value multiplied by the masked state.

5. The method of claim 1, wherein the cryptographic process is a block cipher.

6. The method of claim 1, wherein the cryptographic process is encryption or decryption and the message is respectively a cleartext or a ciphertext.

7. The method of claim 1, wherein each round that is not the last round further includes at least three of the round key operation, a mix column operation, and a shift row operation, or an inverse thereof.

8. The method of claim 2, wherein the cipher is the AES cipher.

9. The method of claim 1, wherein the cipher round key operation includes a logical exclusive-OR operation applied to the state and the round key.

10. A non-transitory computer readable medium storing computer code for carrying out the method of claim 1.

11. An apparatus for performing on a message a cryptographic process which includes a plurality of rounds, each round having an associated round key, each round including a plurality of cipher operations, comprising:
    a port adapted for receiving the message;
    a first computer readable storage coupled to the port and adapted to store the message;
    a processor coupled to the first computer readable storage which applies the plurality of cipher operations for at least one of the rounds sequentially to the message, such that a state is generated for each cipher operation; and
    a second computer readable storage coupled to the processor, to store the state for each cipher operation, and to store the round keys associated with a last round and a previous round as a mask value times the round key of the previous round, a product of the last and previous round keys, and an inverse of the previous round key, wherein the round includes no S-box cipher operation, includes a cipher round key operation, and at least one inversion operation immediately prior to or following the round key operation and further includes an affine bijective function respectively following or prior to the round key operation.

12. The apparatus of claim 11, wherein in combination the affine bijective function and inversion operation are a substitution box operation in a Galois field.

13. The apparatus of claim 11, wherein the processor further:
applies an additive mask value to the round key before executing the inversion operation; and
applies an additive mask value to the state before applying the inversion operation.

14. The apparatus of claim 13, the processor further to store a masked key value and to perform the inversion operation on the masked key value multiplied by the masked state.

15. The apparatus of claim 11, wherein the cryptographic process is a block cipher.

16. The apparatus of claim 11, wherein the cryptographic process is encryption or decryption and the message is respectively a cleartext or a ciphertext.

17. The apparatus of claim 11, wherein each round other than the last round further includes at least three of the round key operation, a mix column operation, and a shift row operation, or an inverse thereof.

18. The apparatus of claim 12, wherein the cipher is the AES cipher.

19. The apparatus of claim 11, wherein the cipher round key operation includes a logical exclusive-OR operation applied to the state and the round key.

20. A computing system for performing on a message a cryptographic block cipher having a plurality of rounds, the system comprising:
a communications port to receive the message;
an information storage system coupled to the communications port, to store the message, and to store state generated during each of the plurality of rounds of the cryptographic block cipher; and
one or more processors coupled to the information storage system, to generate the state by applying the cryptographic block cipher to the message during each of the plurality of rounds, wherein a round key is associated with each round, and the round keys associated with a last round and a previous round are stored as a mask value times the round key of the previous round, a product of the last and previous round keys, and an inverse of the previous round key.

21. The computing system of claim 20, wherein the plurality of rounds include no S-box operation, and include an inversion operation and an affine bijective function.

22. The system of claim 21, wherein in combination the affine bijective function and inversion operation are a substitution box operation in a Galois field.

23. The system of claim 22, wherein the cipher is the AES cipher.

24. The system of claim 21, wherein the one or more processors further:
applies an additive mask value to the round key before executing the inversion operation; and
applies an additive mask value to the state before applying the inversion operation.

25. The system of claim 24, the one or more processors store a masked key value and perform the inversion operation on the masked key value multiplied by the masked state.

* * * * *